(12) United States Patent
Magruder

(10) Patent No.: US 11,396,969 B2
(45) Date of Patent: Jul. 26, 2022

(54) SURFACE MOUNT ASSEMBLY

(71) Applicant: MS ELECTRONICS LLC, Lenexa, KS (US)

(72) Inventor: Loren Paul Magruder, Stilwell, KS (US)

(73) Assignee: MS ELECTRONICS LLC, Lenexa, KS (US)

( * ) Notice: Subject to any disclaimer, the term of this patent is extended or adjusted under 35 U.S.C. 154(b) by 56 days.

(21) Appl. No.: 16/922,146

(22) Filed: Jul. 7, 2020

(65) Prior Publication Data

US 2022/0010916 A1   Jan. 13, 2022

(51) Int. Cl.
| F16M 13/02 | (2006.01) |
| F16M 11/04 | (2006.01) |
| F21V 21/04 | (2006.01) |

(52) U.S. Cl.
CPC .......... *F16M 11/041* (2013.01); *F16M 13/02* (2013.01); *F16M 13/027* (2013.01); *F21V 21/042* (2013.01); *F16M 2200/024* (2013.01); *H04R 2201/021* (2013.01)

(58) Field of Classification Search
CPC .............. H04R 1/025; H04R 2201/021; F16M 13/027; F21V 21/04; F21V 21/042
See application file for complete search history.

(56) References Cited

U.S. PATENT DOCUMENTS

| 6,752,520 | B2 * | 6/2004 | Vernusset | F21V 21/04 248/343 |
| 7,334,767 | B2 * | 2/2008 | Wright | B25B 13/46 248/342 |
| 8,023,664 | B2 * | 9/2011 | Yang | H04R 1/025 381/87 |
| 9,084,046 | B2 * | 7/2015 | Ivey | H04R 1/025 |
| 9,479,852 | B2 * | 10/2016 | Yang | H04R 1/026 |
| 10,142,715 | B2 * | 11/2018 | Ivey | H04R 1/026 |
| 10,171,897 | B2 * | 1/2019 | Hart | H04R 1/025 |
| 10,820,081 | B1 * | 10/2020 | Belliston | F16B 21/065 |
| 11,076,211 | B2 * | 7/2021 | Hart | H04R 1/025 |
| 11,212,604 | B2 * | 12/2021 | You | H04R 1/026 |

* cited by examiner

*Primary Examiner* — Bradley Duckworth
(74) *Attorney, Agent, or Firm* — Hovey Williams LLP

(57) ABSTRACT

A surface mount assembly for mounting a device in a surface opening of a mounting surface includes a frame, a number of locking mechanisms, and a cam ring. Each locking mechanism includes a locking member, a locker, and a coil spring. The cam ring shifts the locker rearward to move the locking member to a deployed orientation when the cam ring is rotated in one direction. The coil spring pushes the locking member to a deployed position against a back side of the mounting surface when the locking member moves to the deployed orientation. The cam ring shifts the locker forward to secure the locking member in the deployed position when the cam is rotated in a second direction opposite the first direction.

15 Claims, 16 Drawing Sheets

SURFACE MOUNT ASSEMBLY

BACKGROUND

Speakers, lights, cameras, sensors, control panels, and other devices are often mounted in walls, ceilings, and other surfaces via unsightly fasteners or other cumbersome mounting hardware. This requires hand tools or power tools and often damages mounting surfaces. In some cases, the device being mounted must be leveled or aligned with other structures for aesthetic purposes. Furthermore, hidden studs must be located via sometimes inaccurate stud finders to support the weight of heavy devices and to prevent fasteners from being dislodged. Ensuring levelness or alignment and finding hidden studs can be difficult and time-consuming. Some surface mount assemblies are retained against mounting surfaces via spring-loaded mechanisms, but the spring-loaded mechanisms do not provide enough biasing force to properly mount the device to the mounting surface.

SUMMARY

Embodiments of the invention solve the above-mentioned problems and other problems by providing a distinct advance in the art of surface mounting. More particularly, the invention provides a self-contained surface mount assembly for mounting a device to a generally flat mounting surface without tools or additional fasteners and with sufficient force to secure the device to the mounting surface.

An embodiment of the invention is a surface mount assembly broadly comprising a frame, a number of locking mechanisms, and an actuation mechanism. The surface mount assembly may be used for mounting a device in a surface opening of a generally flat mounting surface.

The frame includes a number of rearward-extending posts, a number of locker supports near the posts, and a radially outward-extending flange. The frame may be injection molded, machined, or additive manufactured structure. The frame may be monolithic or an assembly of interlocking or fastened components. The frame may be attached to the device via fasteners or interlocking geometry.

Each post includes a central channel, a locking member slot, and a locking member cam. The posts may be equally spaced apart on a rear side of the frame.

The central channel houses a base of a locking member and a biasing element (described below) therein. The central channel may be cylindrical so that the base can axially pivot and translate therein.

The locking member slot extends axially along a radial wall of the post. The locking member slot accommodates a locking arm of the locking member as the base translates in the central channel.

The locking member cam may be an angled surface of the post forming a widened portion of the locking member slot. The locking member cam is configured to engage the locking arm.

Each locker support orients a locker (described below) near the post and guides the locker in diagonal translation relative to the frame and post. To that end, the locker support may include an angled groove configured to engage an angled rail of the locker.

The flange extends radially from a central portion of the frame. The flange is configured to cover and/or abut the mounting surface near the surface opening to ensure a finished appearance.

Each locking mechanism includes a locking member, a locker, and a biasing element. In one embodiment, three equally-spaced locking mechanisms positioned in the posts and locker supports are used.

The locking member includes a base, a locking arm, and a number of locking teeth. The locking member secures the surface mount assembly in the surface opening as described in more detail below.

The base may be a cylindrical pin or other similar anchor positioned in the central channel. The base is configured to radially pivot and axially translate within the central channel.

The locking arm extends radially from the base through the locking member slot. The locking arm is configured to engage a back side of the mounting surface to secure the surface mount assembly in the surface opening.

The locking teeth of the locking member engage locking teeth of the locker to retain the locking arm in engagement with the back side of the mounting surface. Alternatively, a friction surface, latch, compliant mechanism, or the like may be used.

The locker includes a sloped surface and a number of locking teeth. The locker may be configured to translate diagonally toward and away from the frame and the locker support.

The sloped surface descends from a rear corner or side of the locker and is angled toward the locking teeth of the locker. The sloped surface is configured to contact and engage the locking arm.

The locking teeth of the locker engage the locking teeth of the locking member to retain the locking arm in engagement with the back side of the mounting surface. Alternatively, a friction surface, latch, compliant mechanism, or the like may be used.

The biasing element is positioned in the central channel of the post between the base of the locking member and the end cap of the post. The biasing element biases the base and hence the locking arm of the locking member toward the frame. The biasing element may be a coil spring, a leaf spring, a torsion spring, a compliant mechanism, or the like.

The actuation mechanism may be a cam ring encircling a central opening of the frame and includes a number of locker cams. The cam ring is configured to be rotated relative to the frame to secure the surface mount assembly in the surface opening as described in more detail below. Alternatively, the actuation mechanism may be a lever, a linear slide, a screw component, or the like.

Each locker cam is a sloped surface, a helical thread, or the like. The locker cams are configured to engage the lockers when the actuation mechanism is rotated between first and second positions.

In use, the frame is attached to the device via fasteners or interlocking geometry. The speaker and frame are then inserted into the surface opening such that the flange abuts the mounting surface near the surface opening.

The actuation mechanism is then rotated relative to the frame from a first position to a second position with the locker cam engaging and moving the lockers away from the frame. The lockers in turn urge the locking members from an undeployed orientation to a deployed orientation via the sloped surfaces of the lockers and the locking member cams of the posts. The biasing elements also urge the locking members from an undeployed position to a deployed position. Specifically, the biasing elements push the bases of the locking members in the central channels toward the frame. In the deployed position, the locking arms of the locking members contact the back side of the mounting surface so as to sandwich the mounting surface between the flange and the locking arm.

The actuation mechanism is then rotated relative to the frame from the second position to the first position with the a locker cam engaging and moving the lockers toward the frame. The locking teeth of the lockers in turn engage the locking teeth of the locking members so as to retain the locking members in the deployed position. In this way, the surface mount assembly and hence the speaker is secured in the surface opening.

The above-described surface mount assembly provides several advantages. For example, the surface mount assembly does not require any tools or additional hardware to mount the device in the surface opening. The surface mount assembly does not damage the mounting surface. In particular, it is not necessary to drill fastener holes into the mounting surface. The surface mount assembly is self-contained, meaning the components of the surface mount assembly do not need to be held together during installation or assembled by the installer. In some embodiments, the surface mount assembly may be oriented at any angle, thus eliminating the need for leveling or alignment. The actuation mechanism engages the lockers when the locking members are in the deployed position and the actuation mechanism is moved from the second position to the first position such that the lockers retain the locking members in the deployed position so as to secure the surface mount assembly and hence the speaker in the surface opening.

Another embodiment of the invention is a surface mount assembly broadly comprising a frame, a number of locking mechanisms, and a cam ring. The surface mount assembly may be used for speaker in a surface opening of a generally flat mounting surface.

The frame includes a number of rearward-extending posts, a number of locker supports near the posts, a number of locker slots, and a radially outward-extending flange. The frame may be injection molded, machined, or additive manufactured structure. The frame may be monolithic or an assembly of interlocking or fastened components. The frame may be attached to the speaker via fasteners or interlocking geometry.

Each post includes a central channel, a locking member slot, and a locking member cam. The posts may be equally spaced apart on a rear side of the frame.

The central channel houses a base of a locking member and a biasing element (described below) therein. The central channel may be cylindrical so that the base can axially pivot and translate therein.

The locking member slot extends axially along a radial wall of the post. The locking member slot accommodates a locking arm of the locking member as the base translates in the central channel.

The locking member cam may be an angled surface of the post forming a widened portion of the locking member slot. The locking member cam is configured to engage the locking arm as discussed in more detail below.

Each locker support orients a locker of one of the locking mechanisms near the post and guides the locker in diagonal translation relative to the frame and post. To that end, the locker support may include an angled groove configured to engage an angled rail of the locker.

The locker slots extend through a sidewall of the frame and are configured to guide a tab of a locker of one of the locking mechanisms as the locker moves away from and toward the frame. In one embodiment, the locker slots are angled slightly.

The flange extends radially from a central portion of the frame. The flange is configured to cover and/or abut the mounting surface near the surface opening to ensure a finished appearance.

Each locking mechanism includes a locking member, a locker, and a biasing element. In one embodiment, three equally-spaced locking mechanisms positioned in the posts and locker supports are used.

The locking member includes a base, a locking arm, and a number of locking teeth. The locking member secures the surface mount assembly in the surface opening as described in more detail below.

The base may be a cylindrical pin or other similar anchor positioned in the central channel. The base is configured to radially pivot and axially translate within the central channel.

The locking arm extends radially from the base through the locking member slot. The locking arm is configured to engage a back side of the mounting surface to secure the surface mount assembly in the surface opening.

The locking teeth engage locking teeth of the locker to retain the locking arm in engagement with the back side of the mounting surface. Alternatively, a friction surface, latch, compliant mechanism, or the like may be used.

The locker includes a sloped surface, a tab, and a number of locking teeth. The locker may be configured to translate diagonally toward and away from the frame and the locker support.

The sloped surface descends from an rear corner or side of the locker and is angled toward the locking teeth of the locker. The sloped surface is configured to contact and engage the locking arm.

The tab extends into one of the locker slots of the frame. The tab may be retained in the locker slot via a clip, pin, or the like.

The locking teeth of the locker engage the locking teeth of the locking member to retain the locking arm in engagement with the back side of the mounting surface. Alternatively, a friction surface, latch, compliant mechanism, or the like may be used.

The biasing element is positioned in the central channel of the post between the base of the locking member and the end cap of the post. The biasing element biases the base and hence the locking arm of the locking member toward the frame. The biasing element may be a coil spring, a leaf spring, a torsion spring, a compliant mechanism, or the like.

The cam ring encircles a central opening of the frame and includes locker cam helical threads. The helical threads are configured to engage the lockers when the cam ring is rotated between first and second positions. The cam ring is configured to be rotated relative to the frame to secure the surface mount assembly in the surface opening. The cam ring has an acoustic horn shape for projecting soundwaves of the speaker.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
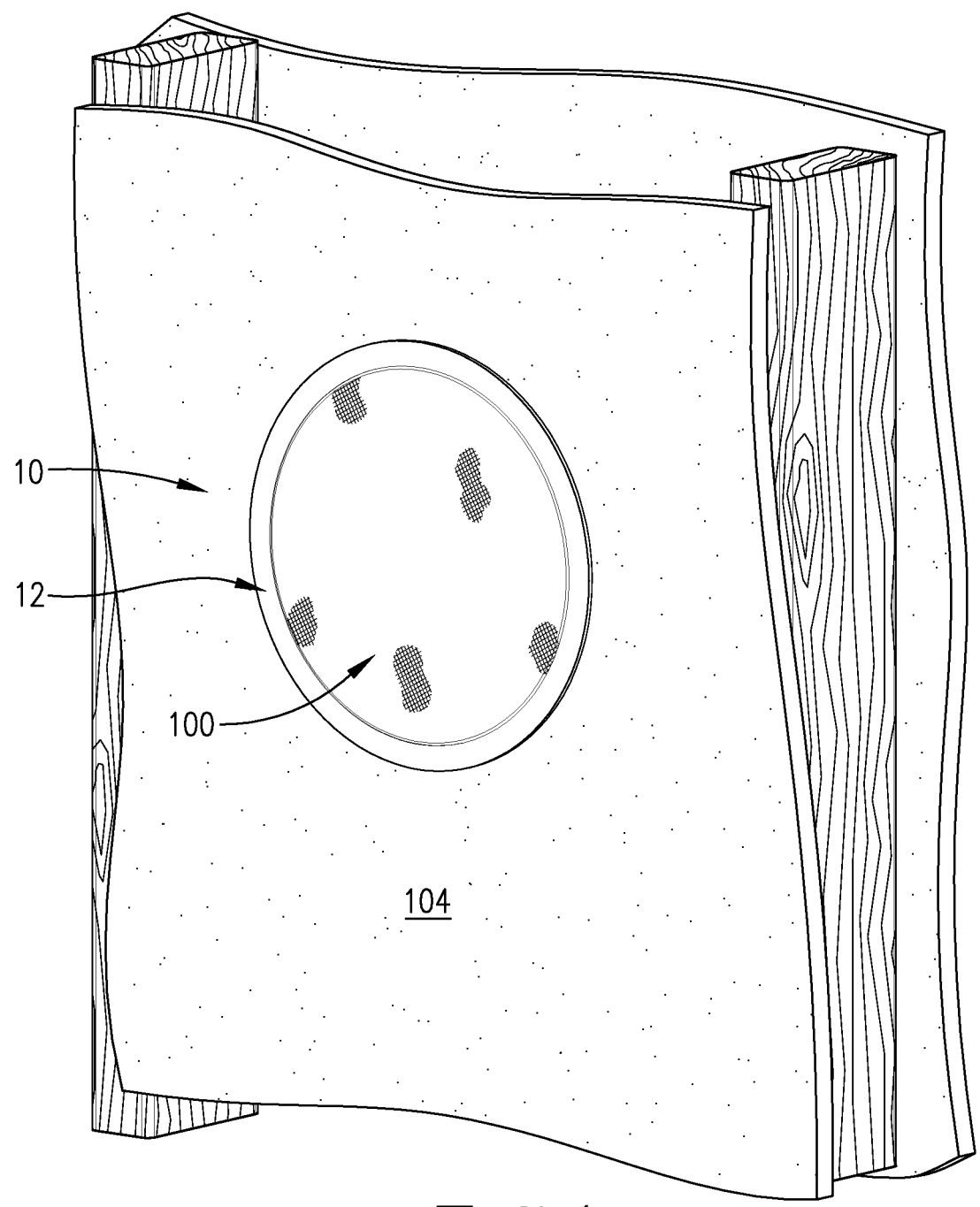
FIG. 1 is a perspective view of a surface mount assembly constructed in accordance with an embodiment of the invention and shown positioned in a wall opening with a wall-mount speaker.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
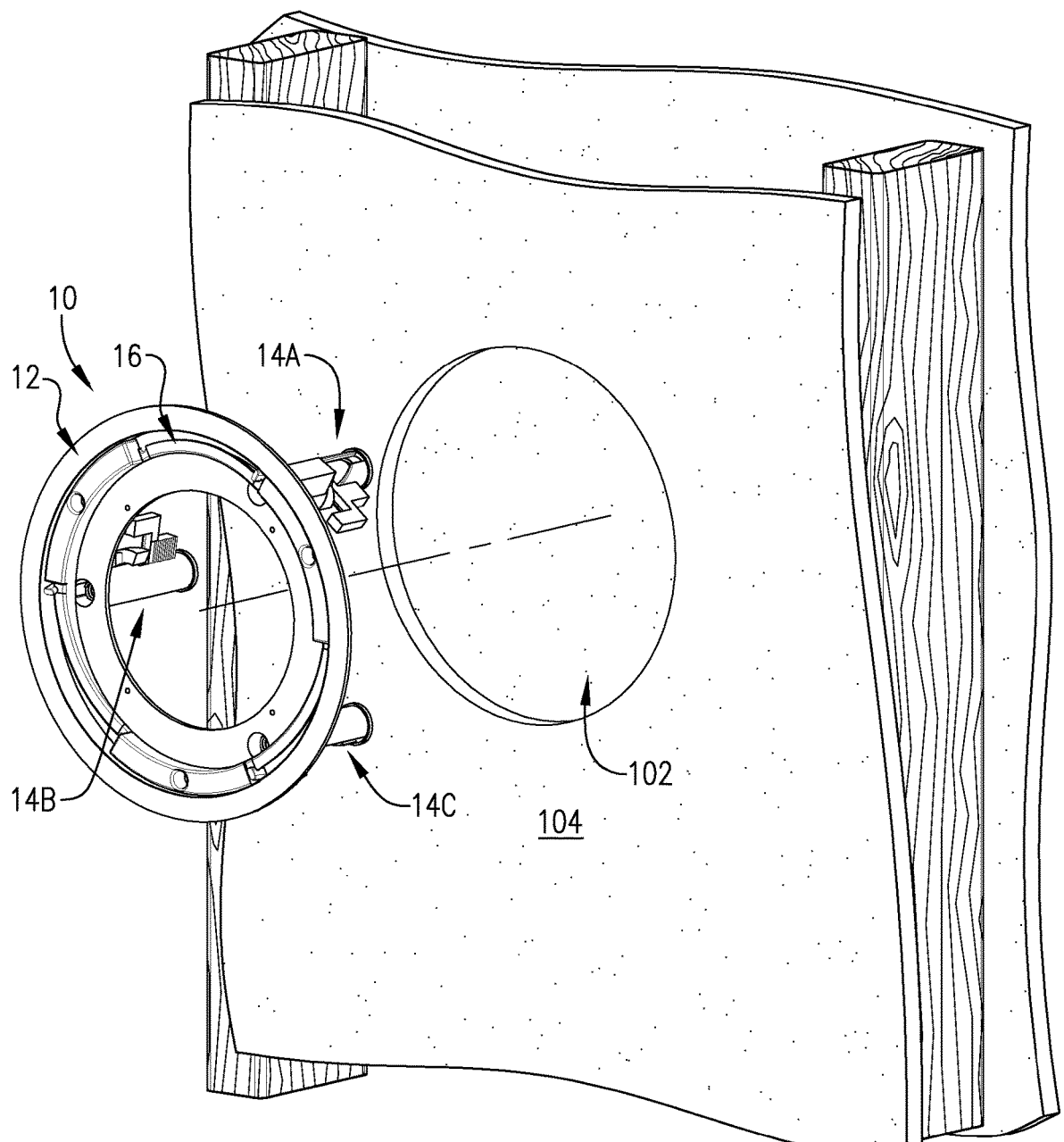
FIG. 2 is a perspective view of the surface mount assembly of FIG. 1 withdrawn from the wall.
Figure 3:
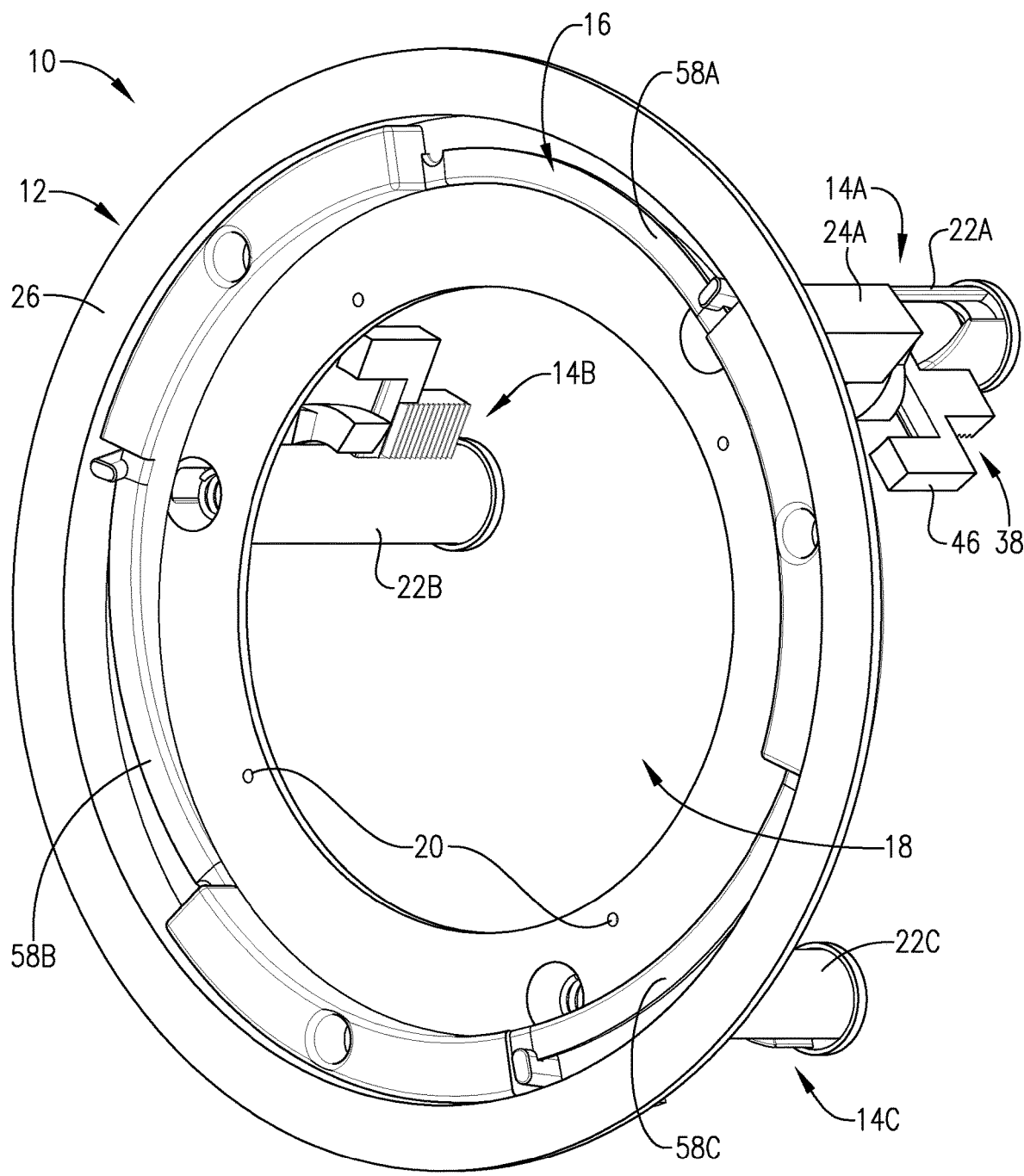
FIG. 3 is an enlarged perspective view of the surface mount assembly of FIG. 1.
Figure 4:
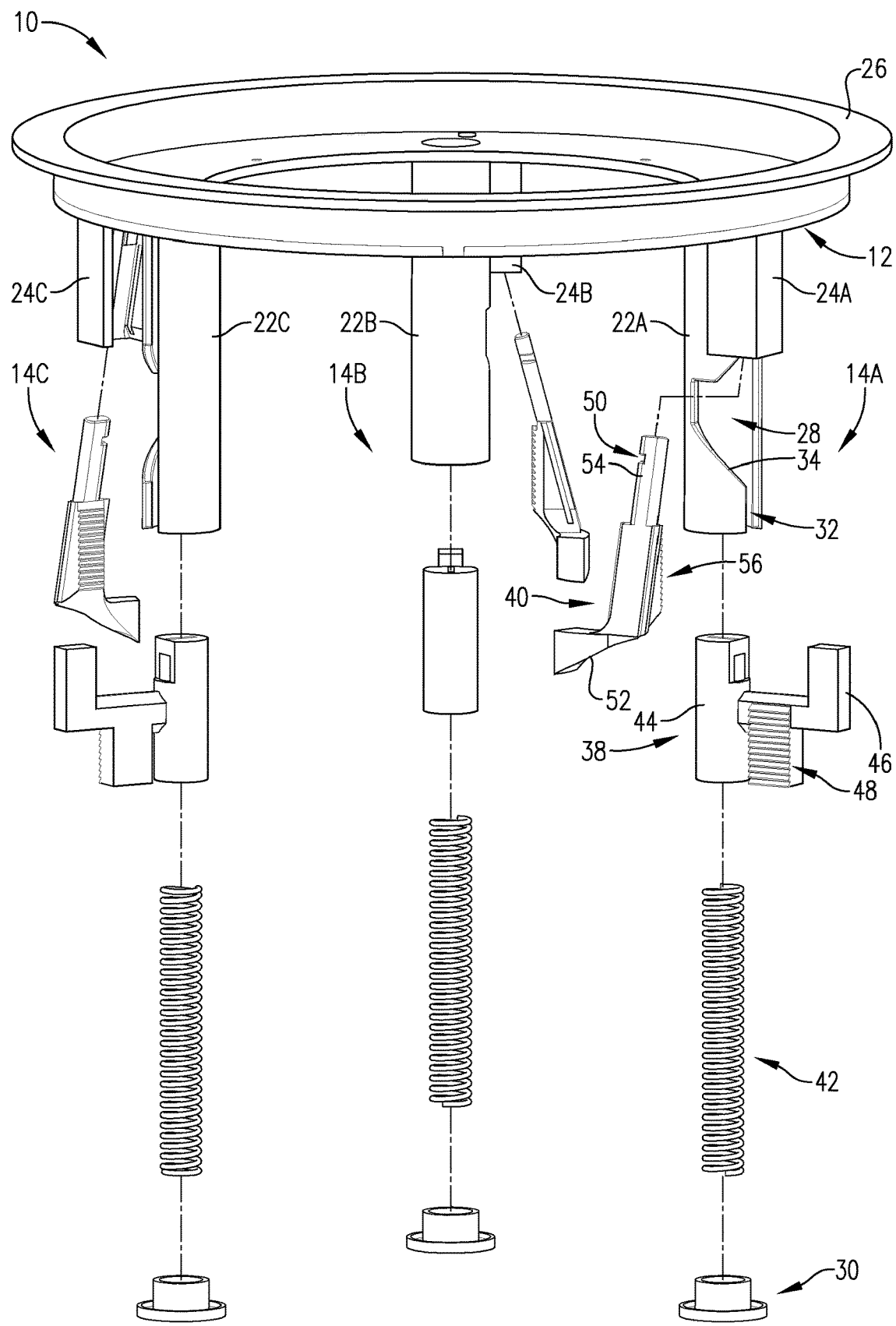
FIG. 4 is an exploded perspective view of the surface mount assembly of FIG. 1.
Figure 5:
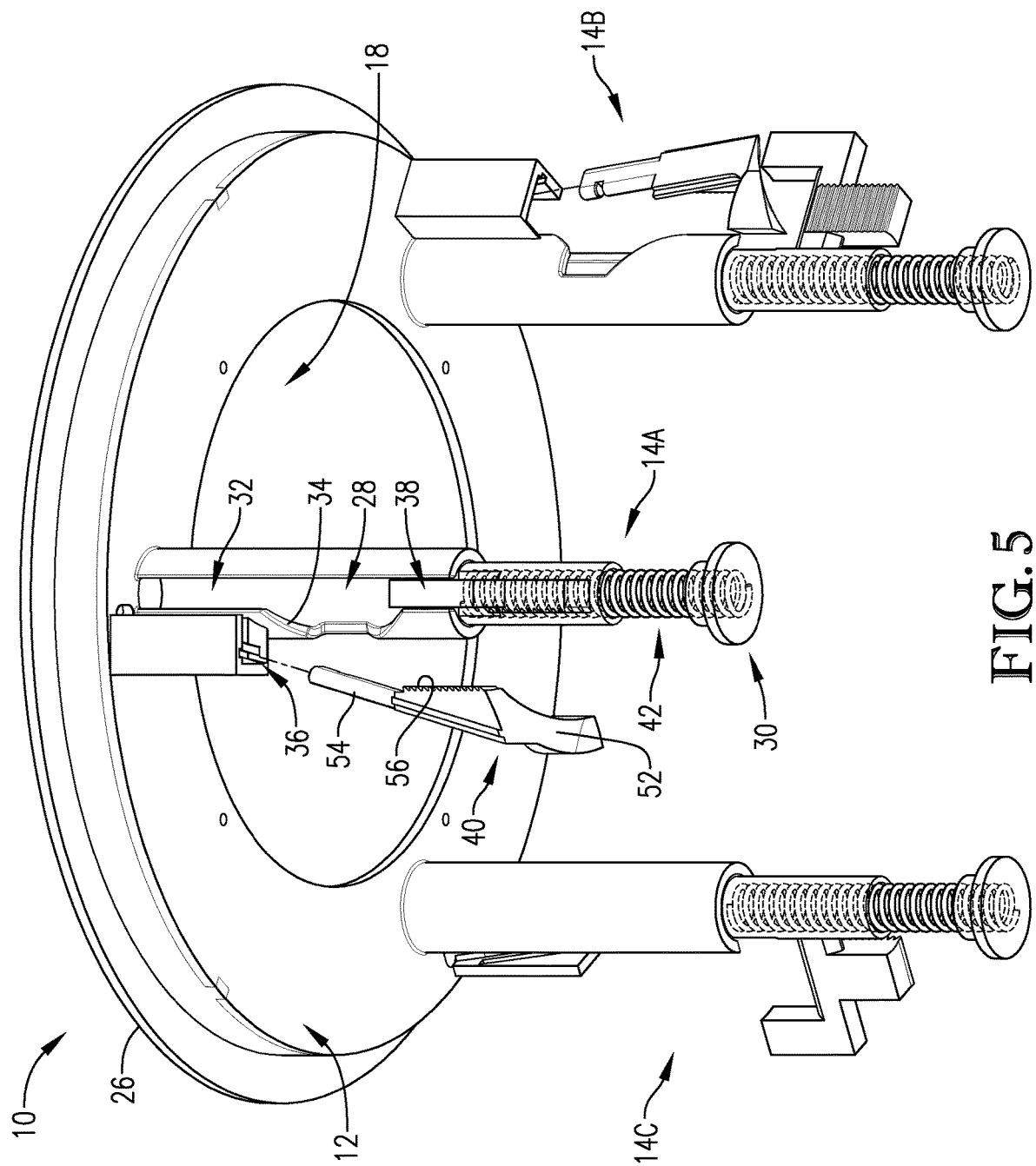
FIG. 5 is a bottom semi-exploded perspective view of the surface mount assembly of FIG. 1.
Figure 6:
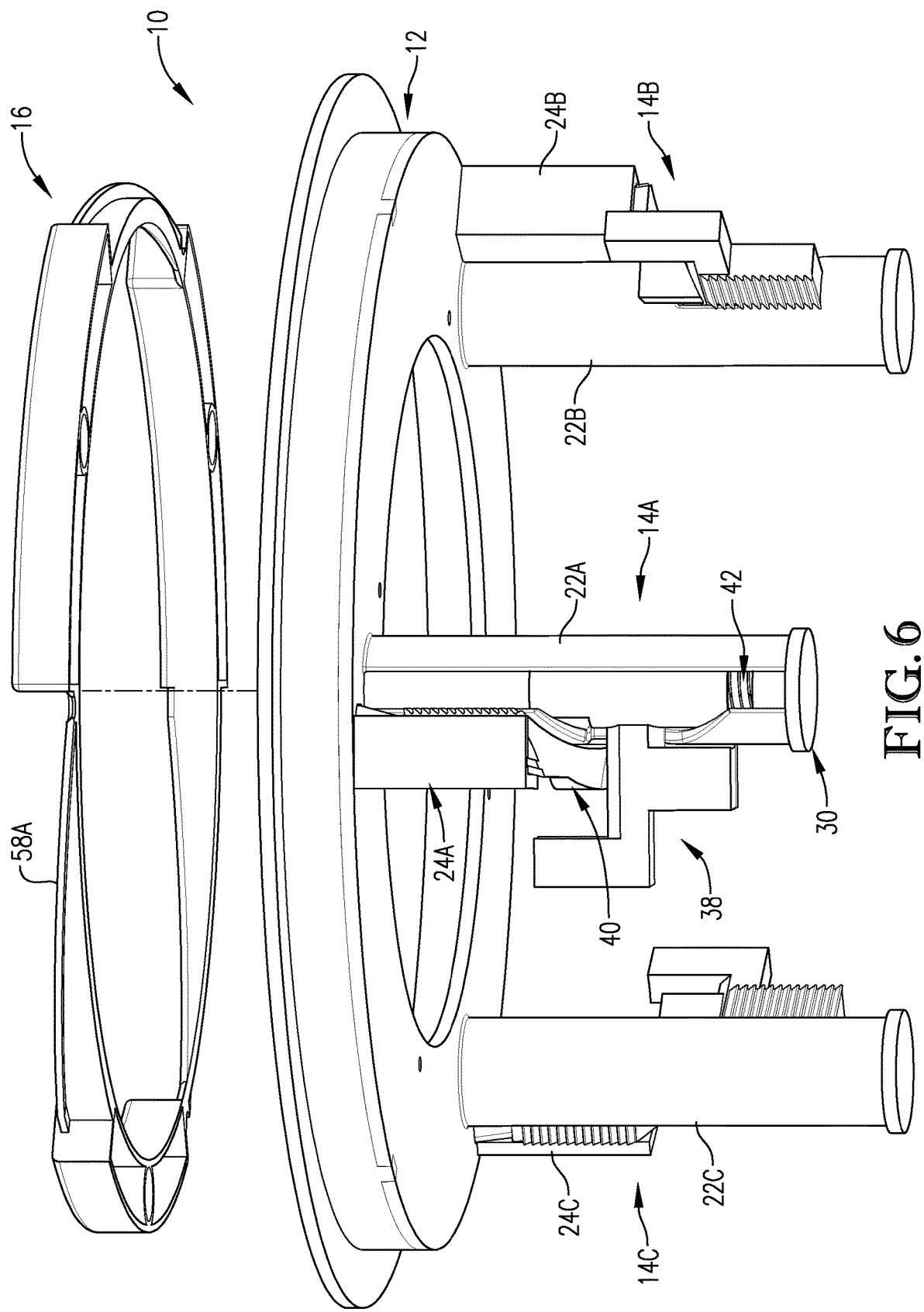
FIG. 6 is a bottom semi-exploded perspective view of the surface mount assembly of FIG. 1.
Figure 7:
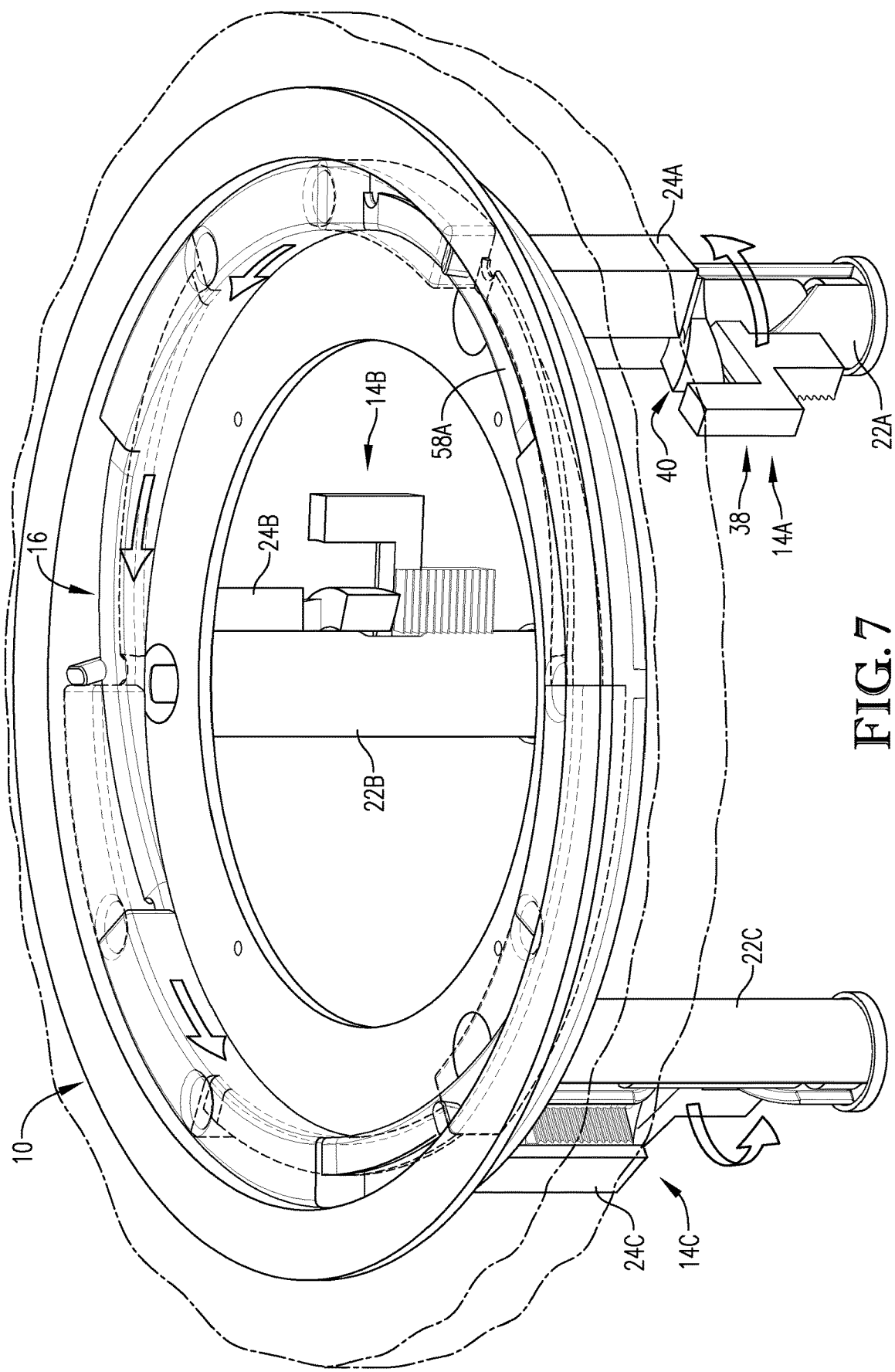
FIG. 7 is a perspective view of the surface mount assembly of FIG. 1.
Figure 8:
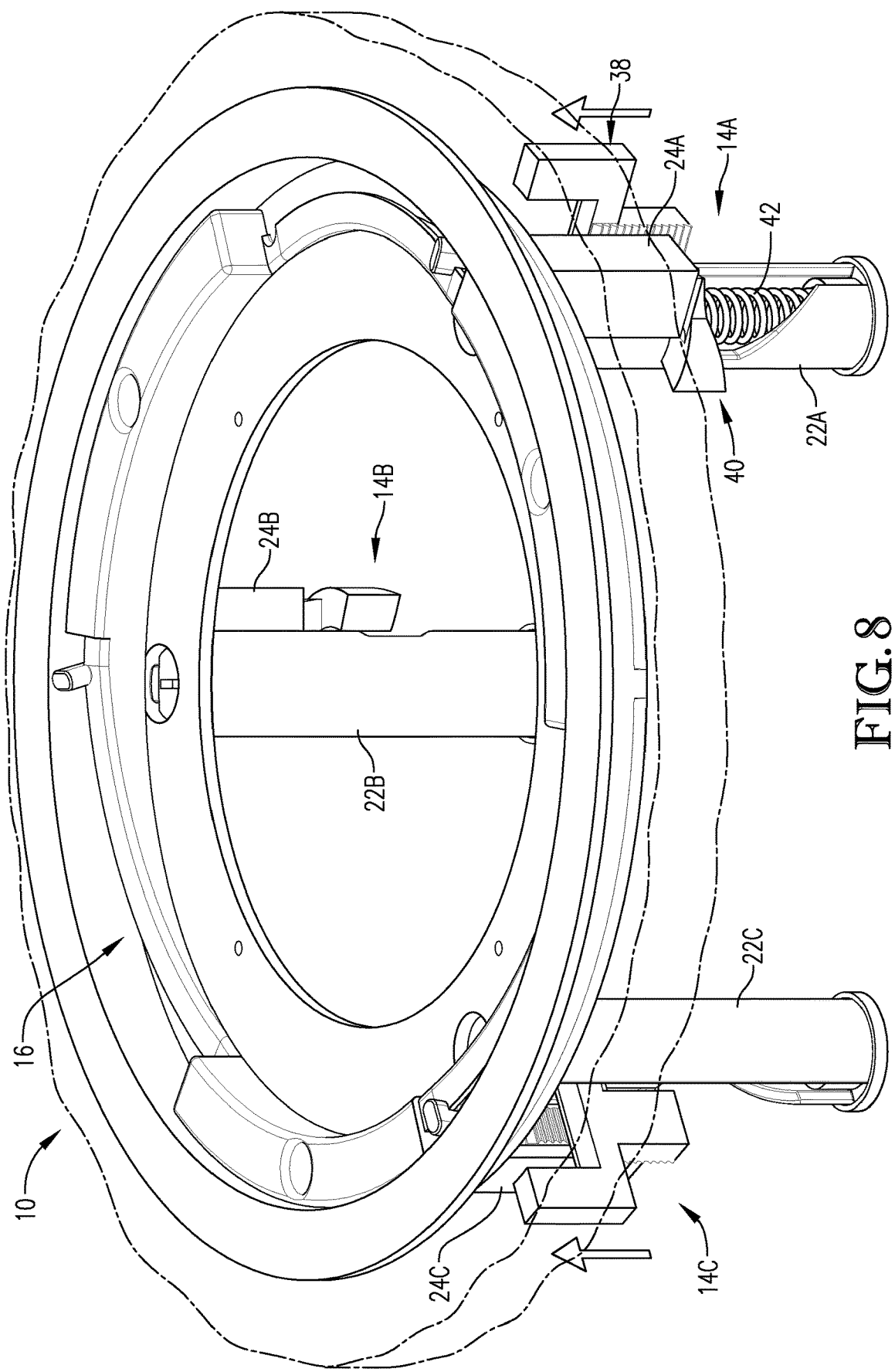
FIG. 8 is a perspective view of the surface mount assembly of FIG. 1.
Figure 9:
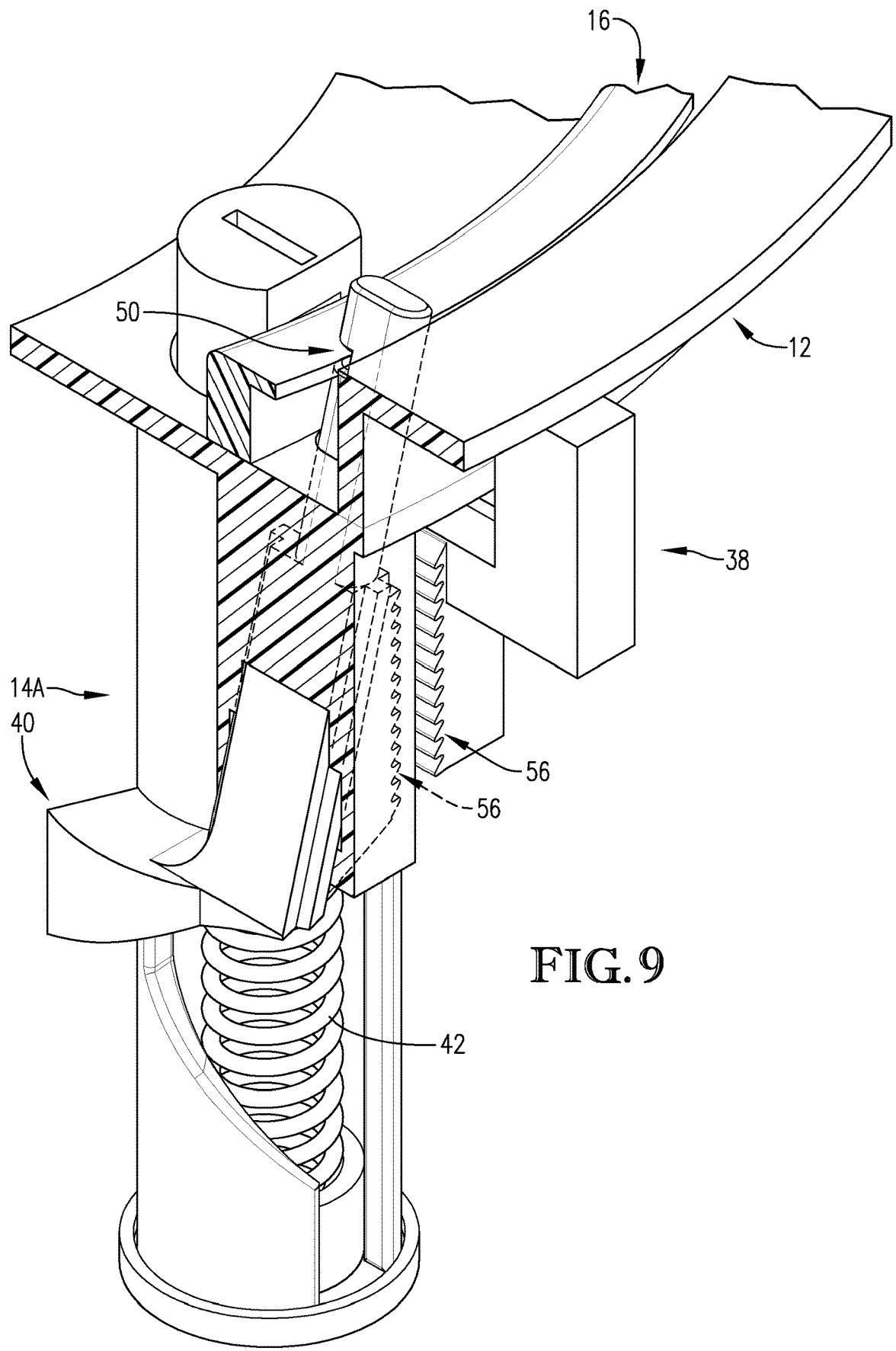
FIG. 9 is a partial cutaway perspective view of the surface mount assembly of FIG. 1.
Figure 10:
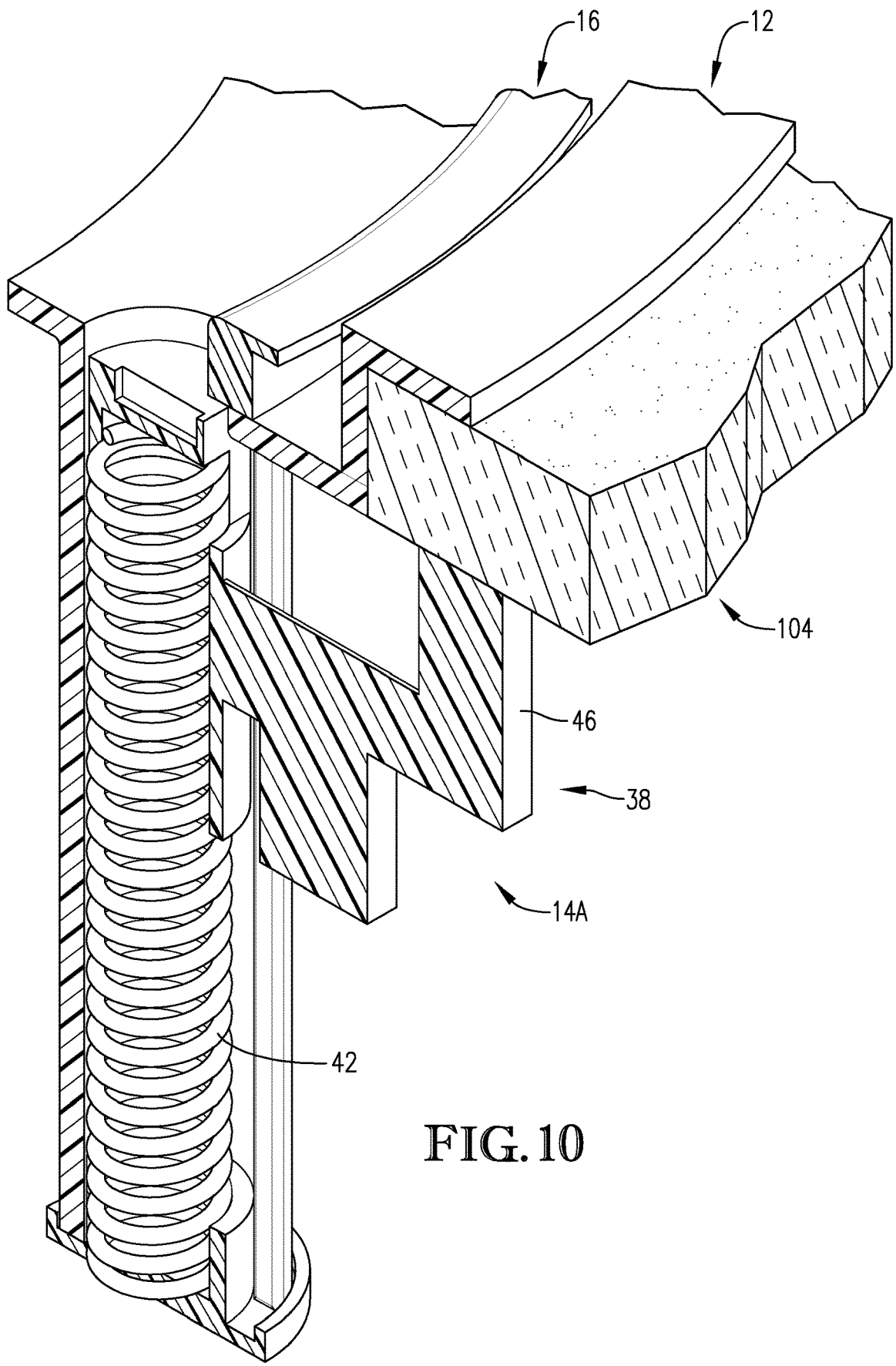
FIG. 10 is a partial cutaway perspective view of the surface mount assembly of FIG. 1.

Turning to FIGS. 1-10, a surface mount assembly 10 constructed in accordance with an embodiment of the invention is illustrated. The surface mount assembly 10 broadly comprises a frame 12, a plurality of locking mechanisms 14A-C, and an actuation mechanism 16. The surface mount assembly 10 is shown supporting a speaker 100 in a surface opening 102 of a wall 104.

The frame 12 includes a central opening 18, a plurality of device mounting holes 20, a plurality of posts 22A-C, a plurality of locker supports 24A-C, and a flange 26. The frame 12 may be injection molded, machined, or additive manufactured structure. The frame 12 may be monolithic or an assembly of interlocking or fastened components.

The central opening 18 may be a large circular aperture or any other suitable shape corresponding to a shape of the speaker 100. The central opening 18 may be concentric with other features of the frame 12. The central opening 18 provides access to the speaker 100 and an unobstructed area for projecting sound from the speaker 100.

The device mounting holes 20 receive fasteners therethrough for attaching the speaker 100 to the frame 12. Alternatively, notches, slats, mounting bosses, or other features may be used for receiving or interlocking with corresponding features of the speaker 100.

The posts 22A-C are substantially similar and thus only post 22A will be described in detail. The post 22A includes a central channel 28, an end cap 30, a locking member slot 32, and a locking member cam 34.

The central channel 28 receives a base of a locking member and a biasing element (described below) therein. The central channel 28 may be cylindrical so that the base can axially pivot and translate therein.

The end cap 30 covers a rear end of the central channel 28 to retain the locking member and biasing element in the central channel 28. The end cap 30 may be removable for inserting the locking member and biasing element in the central channel 28.

The locking member slot 32 extends axially along a radial wall of the post 22A. The locking member slot 32 accommodates a locking arm of the locking member as the base translates in the central channel 28.

The locking member cam 34 may be an angled surface of the post 22A forming a widened portion of the locking member slot 32. The locking member cam 34 is configured to engage the locking arm as discussed in more detail below.

The locker supports 24A-C are substantially similar and thus only locker support 24A will be described in detail. The locker support 24A orients a locker (described below) near the post 22A and guides the locker in diagonal translation relative to the frame 12 and post 22A. To that end, the locker support 24A may include an angled groove 36 configured to engage an angled rail of the locker.

The flange 26 extends radially from a central portion of the frame 12. The flange 26 is configured to cover and/or abut the mounting surface near the surface opening to ensure a finished appearance.

The locking mechanisms 14A-C are substantially similar and thus only locking mechanism 14A will be described in detail. The locking mechanism 14A broadly comprises a locking member 38, a locker 40, and a biasing element 42. Although three equally-spaced locking mechanisms 14A-C are shown, other numbers and arrangements of locking mechanisms may be used.

The locking member 38 includes a base 44, a locking arm 46, and a plurality of locking teeth 48. The locking member 38 secures the surface mount assembly 10 in the surface opening as described in more detail below.

The base 44 may be a cylindrical pin or other similar anchor positioned in the central channel 28. The base 44 is configured to radially pivot and axially translate within the central channel 28.

The locking arm 46 extends radially from the base 44 through the locking member slot 32. The locking arm 46 is configured to engage a back side of the mounting surface to secure the surface mount assembly 10 in the surface opening.

The plurality of locking teeth 48 engage locking teeth of the locker 40 to retain the locking arm 46 in engagement with the back side of the mounting surface. Alternatively, a friction surface, latch, compliant mechanism, or the like may be used.

The locker 40 includes a cam follower notch 50, a sloped surface 52, an angled rail 54, and a plurality of locking teeth 56. The locker 40 may be configured to translate diagonally toward and away from the frame 12 and the locker support 24A.

The cam follower notch 50 is entrained on a locker cam of the actuation mechanism 16 (described below). To that end, the cam follower notch 50 may be a recess, groove, slot, or the like.

The sloped surface 52 descends from an rear corner or side of the locker 40 and is angled toward the plurality locking teeth 56. The sloped surface 52 is configured to contact and engage the locking arm 46.

The angled rail 54 is positioned in the angled groove 36 of the locker support 24A. The angled rail 54 ensures the locker 40 moves diagonally relative to the frame 12 and post 22A.

The plurality of locking teeth 56 engage the locking teeth 48 of the locking member 38 to retain the locking arm 46 in engagement with the back side of the mounting surface. Alternatively, a friction surface, latch, compliant mechanism, or the like may be used.

The biasing element 42 is positioned in the central channel 28 of the post 22A between the base 44 of the locking member 38 and the end cap 30 of the post 22A. The biasing element 42 biases the base 44 and hence the locking arm 46 of the locking member 38 toward the frame 12. The biasing element 42 may be a coil spring, a leaf spring, a torsion spring, a compliant mechanism, or the like.

The actuation mechanism 16 includes a plurality of locker cams 58A-C and is configured to be moved relative to the frame 12 so as to secure the surface mount assembly 10 in the surface opening 102 as described in more detail below. In one embodiment, the actuation mechanism 16 is a cam ring encircling the central opening 18 and configured to be rotated relative to the frame 12. Alternatively, the actuation mechanism 16 may be a lever, a linear slide, a screw component, or the like.

The locker cams 58A-C are substantially similar so only locker cam 58A will be described in detail. The locker cam 58A may be a sloped surface, a helical thread, or the like. The locker cam 58A is configured to be entrained in the cam follower notch 50.

Use of the above-described surface mount assembly 10 will now be described in more detail. First, the speaker 100 may be attached to a back side of the frame 12 via fasteners inserted into the device mounting holes 20. The speaker 100 should face the frame 12 for projecting sound through the central opening 18 of the frame 12. The speaker 100 and frame 12 may then be inserted into the surface opening such that the flange 26 abuts the mounting surface near the surface opening.

The actuation mechanism 16 may then be moved relative to the frame 12 from a first position to a second position with the locker cam 58 engaging the cam follower notch 50 so that the actuation mechanism 16 moves the locker 40 away from the frame 12. The locker 40 may move diagonally away from the frame 12 due to the angled rail 54 being entrained in the angled groove 36 of the locker support 24A. The locker 40 in turn urges the locking member 38 from an undeployed orientation to a deployed orientation via the sloped surface 52 of the locker 40 and the locking member cam 34 of the post 22A. The biasing element 42 also urges the locking member 38 from an undeployed position to a deployed position. Specifically, the biasing element 42 pushes the base 44 of the locking member 38 in the central channel 28 toward the frame 12. In the deployed position, the locking arm 46 of the locking member 38 contacts the back side of the mounting surface so as to sandwich the mounting surface between the flange 26 and the locking arm 46.

The actuation mechanism 16 may then be moved relative to the frame 12 from the second position to the first position with the locker cam 58 engaging the cam follower notch 50 so that the actuation mechanism 16 moves the locker 40 toward the frame 12. The locker 40 may move diagonally toward the frame 12 due to the angled rail 54 being entrained in the angled groove 36 of the locker support 24A. The locking teeth 56 of the locker 40 in turn engage the locking teeth 48 of the locking member 38 so as to retain the locking member 38 in the deployed position. In this way, the surface mount assembly 10 and hence the speaker 100 is secured in the surface opening.

The above-described surface mount assembly 10 provides several advantages. For example, the surface mount assembly 10 does not require any tools or additional hardware to mount the speaker 100 in the surface opening. The surface mount assembly 10 does not damage the mounting surface. In particular, it is not necessary to drill fastener holes into the mounting surface. The surface mount assembly 10 is self-contained, meaning the components of the surface mount assembly 10 do not need to be held together during installation or assembled by the installer. In some embodiments, the surface mount assembly 10 may be oriented at any angle, thus eliminating the need for leveling or alignment. The actuation mechanism 16 engages the lockers when the locking members are in the deployed position and the actuation mechanism 16 is moved from the second position to the first position such that the lockers retain the locking members in the deployed position so as to secure the surface mount assembly 10 and hence the speaker 100 in the surface opening 102.

Figure 11:
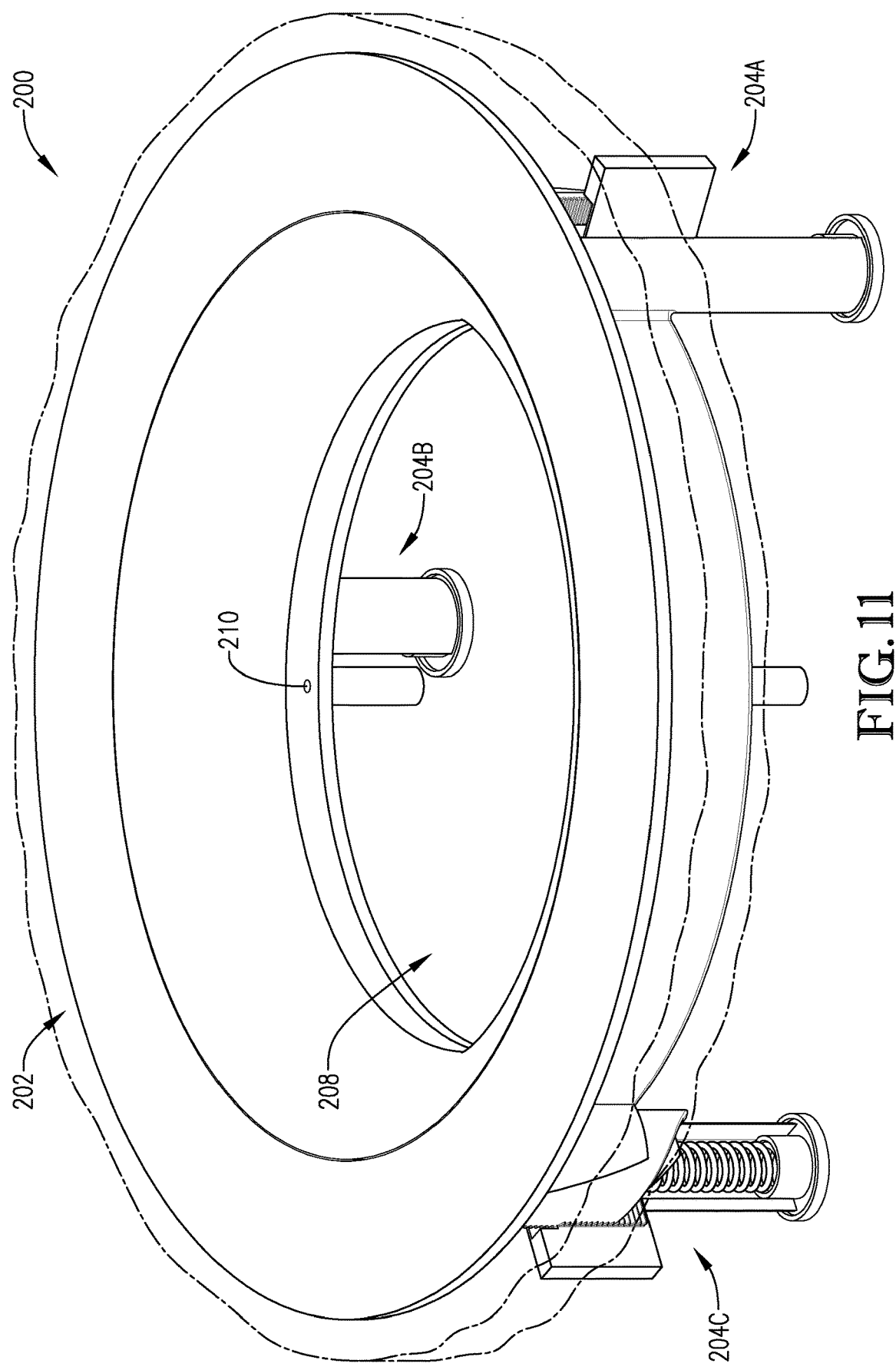
FIG. 11 is a perspective view of the surface mount assembly constructed in accordance with another embodiment of the invention.
Figure 12:
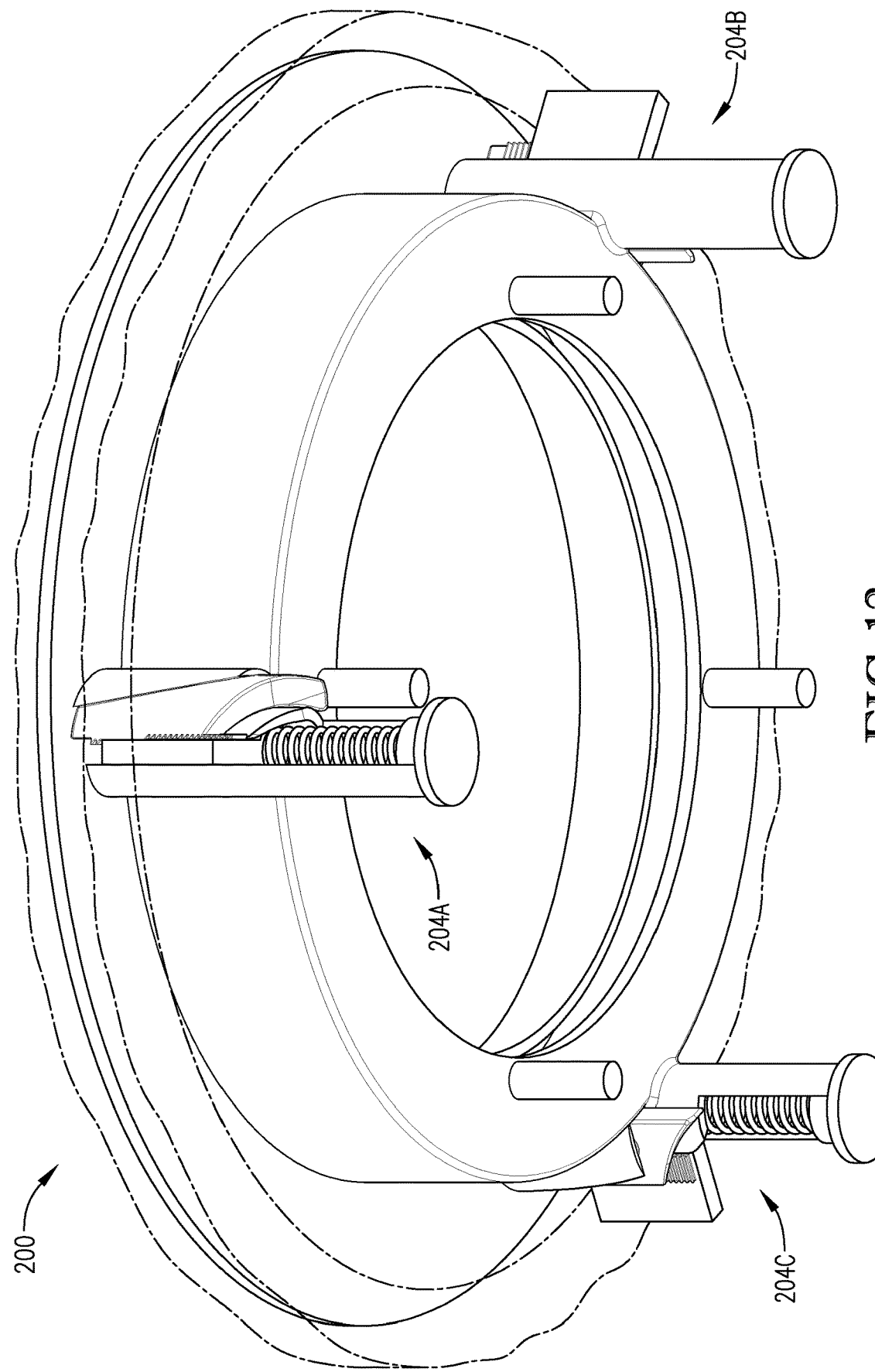
FIG. 12 is a bottom perspective view of the surface mount assembly of FIG. 11.
Figure 13:
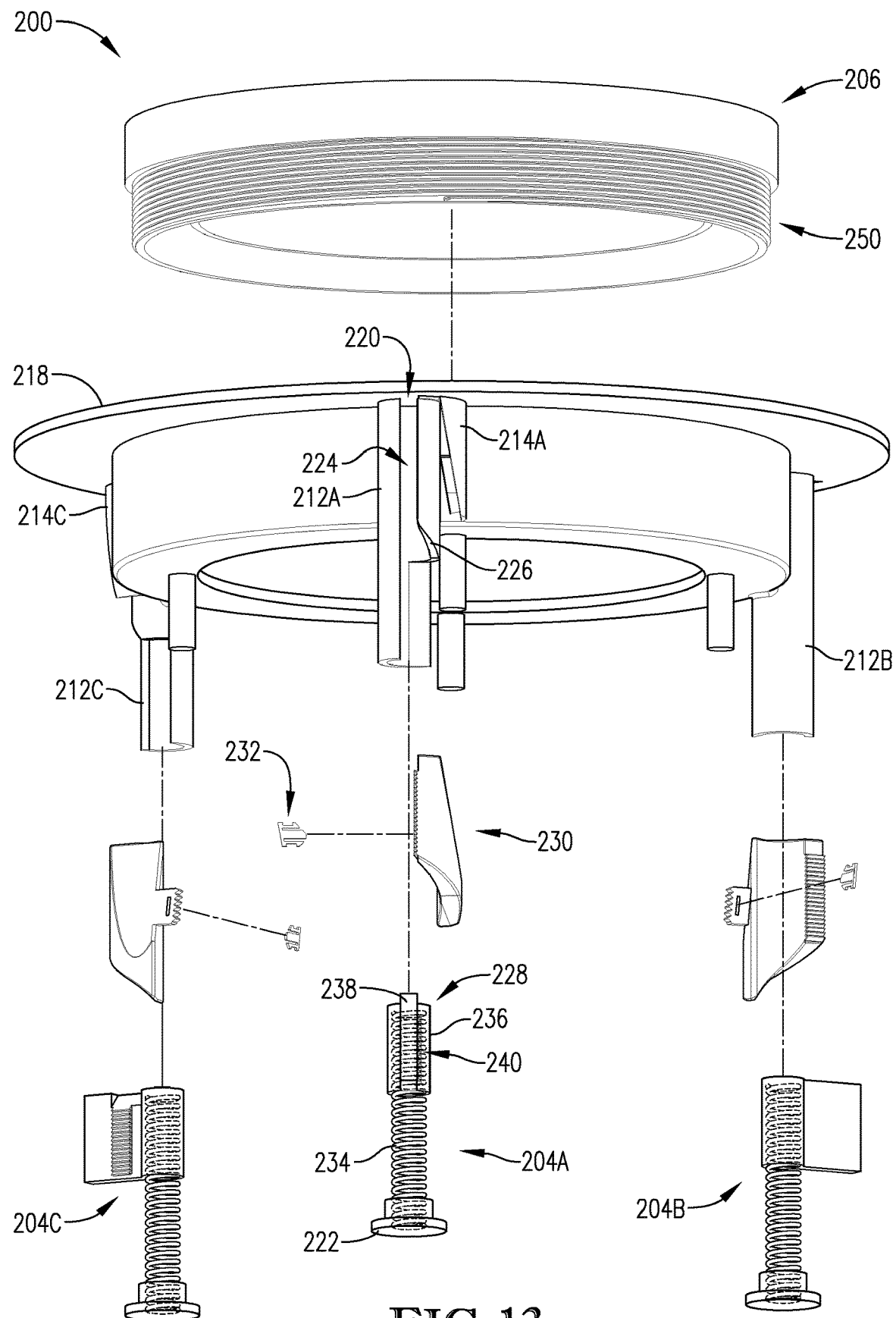
FIG. 13 is a bottom exploded perspective view of the surface mount assembly of FIG. 11.
Figure 14:
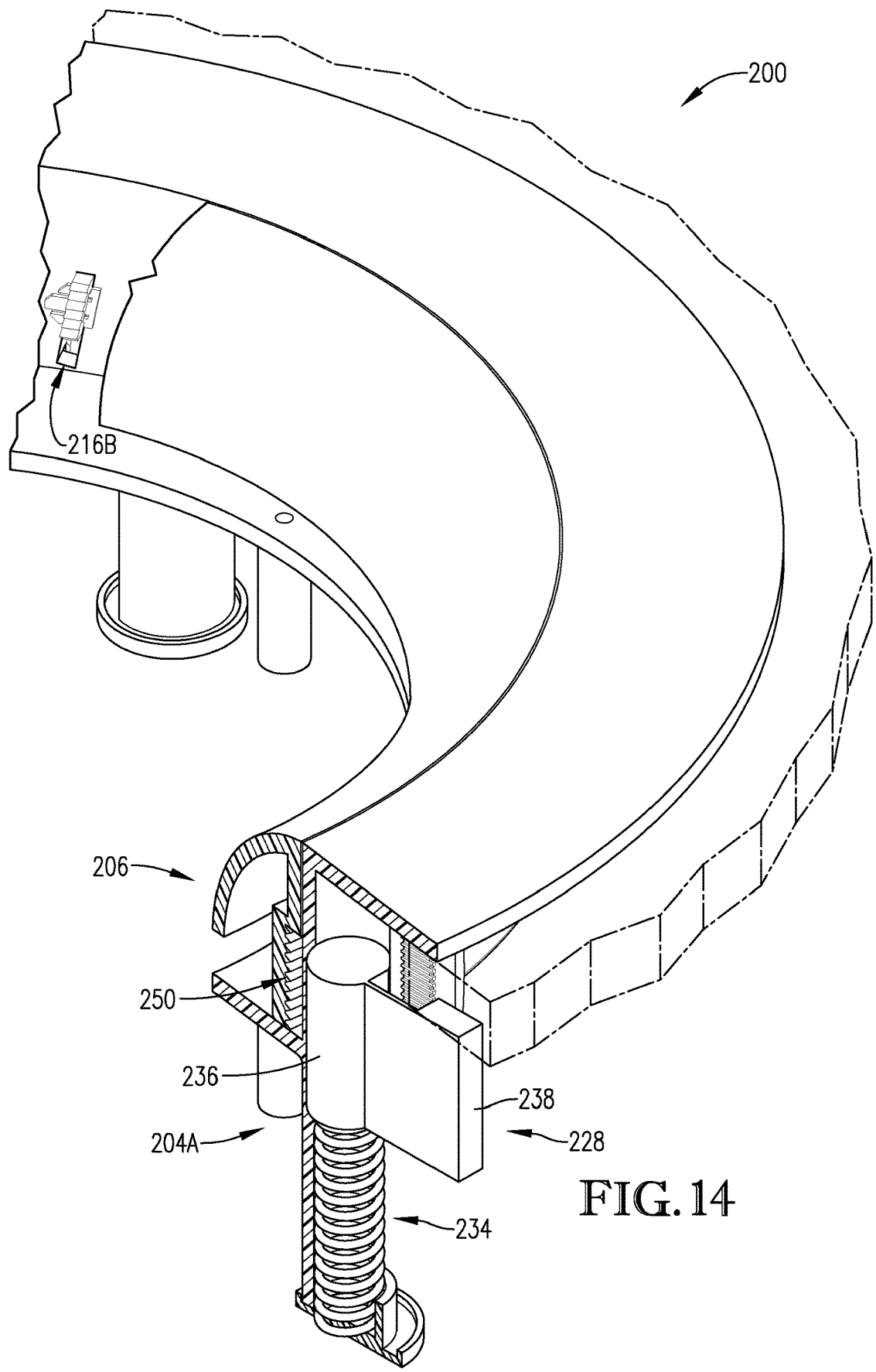
FIG. 14 is a partial cutaway perspective view of the surface mount assembly of FIG. 11.
Figure 15:
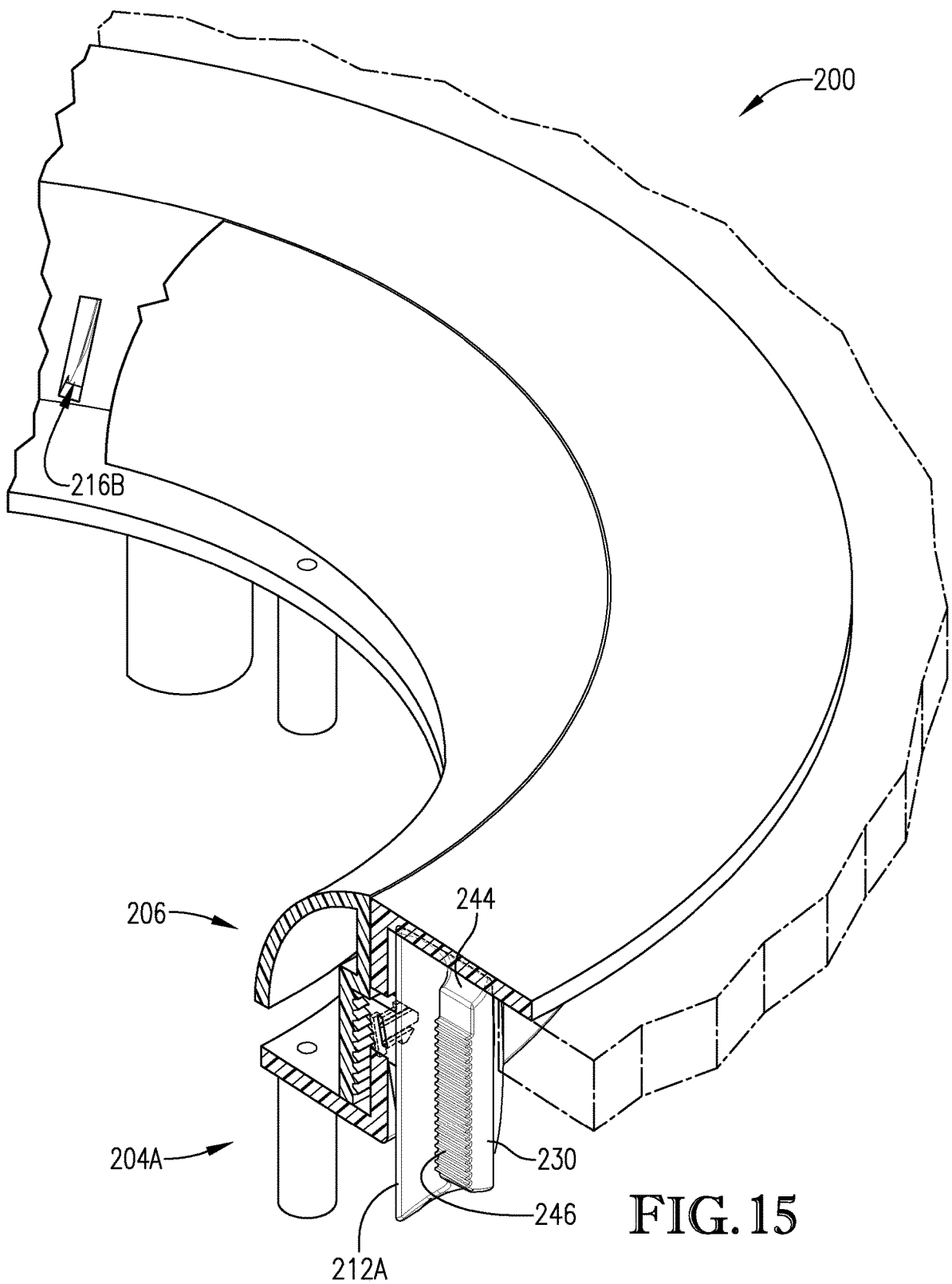
FIG. 15 is a partial cutaway perspective view of the surface mount assembly of FIG. 11.
Figure 16:
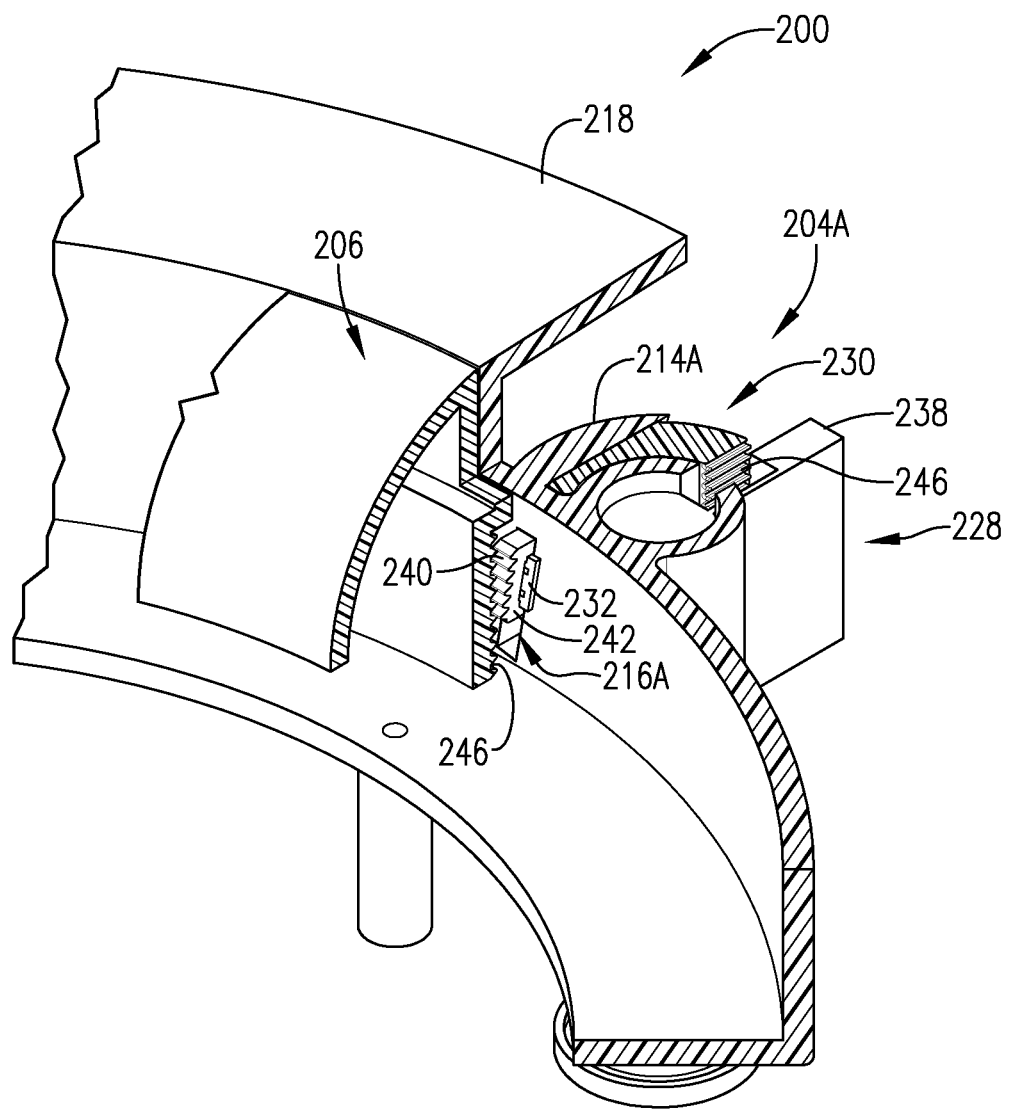
FIG. 16 is a partial cutaway perspective view of the surface mount assembly of FIG. 11.

Turning to FIGS. 11-16, a surface mount assembly 200 constructed in accordance with another embodiment is illustrated. The surface mount assembly 200 broadly comprises a frame 202, a plurality of locking mechanisms 204A-C, and a cam ring 206. The surface mount assembly 200 may be used for mounting a tweeter, a midrange speaker, a woofer, or any other suitable speaker in a surface opening of a generally flat mounting surface.

The frame 202 includes a central opening 208, a plurality of device mounting holes 210, a plurality of posts 212A-C, a plurality of locker supports 214A-C, a plurality of locker slots (showing locker slots 216A, B although it will be appreciated a third locker slot would be used for a third locking mechanism), and a flange 218. The frame 202 may be injection molded, machined, or additive manufactured structure. The frame 202 may be monolithic or an assembly of interlocking or fastened components.

The central opening 208 may be a large circular aperture or any other suitable shape corresponding to a shape of the speaker. The central opening 208 may be concentric with other features of the frame 202. The central opening 208 provides access to the speaker and an unobstructed area for projecting sound from the speaker.

The device mounting holes 210 receive fasteners therethrough for attaching the speaker to the frame 202. Alternatively, notches, slats, mounting bosses, or other features may be used for receiving or interlocking with corresponding features of the speaker.

The posts 212A-C are substantially similar and thus only post 212A will be described in detail. The post 212A includes a central channel 220, an end cap 222, a locking member slot 224, and a locking member cam 226.

The central channel 220 receives a base of a locking member and a biasing element (described below) therein. The central channel 220 may be cylindrical so that the base can axially pivot and translate therein.

The end cap 222 covers a rear end of the central channel 220 to retain the locking member and biasing element in the central channel 220. The end cap 222 may be removable for inserting the locking member and biasing element in the central channel 220.

The locking member slot 224 extends axially along a radial wall of the post 212A. The locking member slot 224 accommodates a locking arm of the locking member as the base translates in the central channel 220.

The locking member cam 226 may be an angled surface of the post 212A forming a widened portion of the locking member slot 224. The locking member cam 226 is configured to engage the locking arm as discussed in more detail below.

The locker supports 214A-C are substantially similar and thus only locker support 214A will be described in detail. The locker support 214A orients a locker (described below) near the post 212A and may be shaped to guide the locker in diagonal translation relative to the frame 202 and post 212A.

The locker slots 216A-B receive a tab of a locker of one of the locking mechanisms 204A-C (described below). The locker slots 216A-B may be angled for guiding the locker in diagonal translation relative to the frame 202 and post 212A.

The flange 218 extends radially from a central portion of the frame 202. The flange 218 is configured to cover and/or abut the mounting surface near the surface opening to ensure a finished appearance.

The locking mechanisms 204A-C are substantially similar and thus only locking mechanism 204A will be described in detail. The locking mechanism 204A broadly comprises a locking member 228, a locker 230, a clip 232, and a biasing element 234. Although three equally-spaced locking mechanisms 204A-C are shown, other numbers and arrangements of locking mechanisms may be used.

The locking member 228 includes a base 236, a locking arm 238, and a plurality of locking teeth 240. The locking member 228 secures the surface mount assembly 200 in the surface opening as described in more detail below.

The base 236 may be a cylindrical pin or other similar anchor positioned in the central channel 220. The base 236 is configured to radially pivot and axially translate within the central channel 220.

The locking arm 238 extends radially from the base 236 through the locking member slot 224. The locking arm 238 is configured to engage a back side of the mounting surface to secure the surface mount assembly 200 in the surface opening.

The plurality of locking teeth 240 engage locking teeth of the locker 230 to retain the locking arm 238 in engagement with the back side of the mounting surface. Alternatively, a friction surface, latch, compliant mechanism, or the like may be used.

The locker 230 includes a tab 242, a sloped surface 244, and a plurality of locking teeth 246. The locker 230 may be configured to translate diagonally toward and away from the frame 202 and the locker support 214A.

The tab 242 includes cam follower teeth 248 for engaging a locker cam of the cam ring 206 and extends into or through the locker slot 216A. The tab 242 is configured to be interlocked with the clip 232 to retain the tab 242 in the locker slot 216A.

The cam follower teeth 248 are entrained on a locker cam of the cam ring 206 (described below). Alternatively, grooves, slots, or the like may be used.

The sloped surface 244 descends from an rear corner or side of the locker 230 and is angled toward the plurality locking teeth 246. The sloped surface 244 is configured to contact and engage the locking arm 238.

The plurality of locking teeth 246 engage the locking teeth 240 of the locking member 228 to retain the locking arm 238 in engagement with the back side of the mounting surface. Alternatively, a friction surface, latch, compliant mechanism, or the like may be used.

The clip 232 interlocks with the tab 242 of the locker 230 to retain the tab 242 in the locker slot 216A. Alternatively, a pin, fastener, or the like may be used.

The biasing element 234 is positioned in the central channel 220 of the post 212A between the base 236 of the locking member 228 and the end cap 222 of the post 212A. The biasing element 234 biases the base 236 and hence the locking arm 238 of the locking member 228 toward the frame 202. The biasing element 234 may be a coil spring, a leaf spring, a torsion spring, a compliant mechanism, or the like.

The cam ring 206 encircles the central opening 208 of the frame 202 and includes a locker cam 250. The cam ring 206 is configured to be rotated relative to the frame 202 so as to secure the surface mount assembly 200 in the surface opening as described in more detail below. The cam ring 206 may have an acoustic horn shape for projecting sound waves from a speaker.

The locker cam 250 may be helical threads wrapping around an annular surface of the cam ring 206. The locker cam 250 is configured to be entrained in the cam follower teeth 248.

Use of the above-described surface mount assembly 200 will now be described in more detail. First, the speaker may be attached to a back side of the frame 202 via fasteners inserted into the device mounting holes 210. The speaker should face the frame 202 for projecting sound through the central opening 208 of the frame 202. The speaker and frame 202 may then be inserted into the surface opening such that the flange 218 abuts the mounting surface near the surface opening.

The cam ring 206 may then be rotated relative to the frame 202 from a first position to a second position with the locker cam 250 engaging the cam follower teeth 248 of the tab 242 of the locker 230 so that the cam ring 206 moves the locker 230 away from the frame 202. The locker 230 may move diagonally away from the frame 202 due to the locker slot 216A being angled. The locker 230 in turn urges the locking member 228 from an undeployed orientation to a deployed orientation via the sloped surface 244 of the locker 230 and the locking member cam 226 of the post 212A. The biasing element 234 also urges the locking member 228 from an undeployed position to a deployed position. Specifically, the biasing element 234 pushes the base 236 of the locking member 228 in the central channel 220 toward the frame 202. In the deployed position, the locking arm 238 of the locking member 228 contacts the back side of the mounting surface so as to sandwich the mounting surface between the flange 218 and the locking arm 238.

The cam ring 206 may then be rotated relative to the frame 202 from the second position to the first position with the locker cam 250 engaging the cam follower teeth 248 so that the cam ring 206 moves the locker 230 toward the frame 202. The locker 230 may move diagonally toward the frame 202 due to the locker slot 216A being angled. The locking teeth 246 of the locker 230 in turn engage the locking teeth 240 of the locking member 228 so as to retain the locking member 228 in the deployed position. In this way, the surface mount assembly 200 and hence the speaker is secured in the surface opening.

The above-described surface mount assembly 200 provides several advantages. For example, the cam ring 206 may be acoustic horn shaped for projecting sound waves from the speaker. The surface mount assembly 200 does not require any tools or additional hardware to mount the speaker in the surface opening. The surface mount assembly 200 does not damage the mounting surface. In particular, it is not necessary to drill fastener holes into the mounting surface. The surface mount assembly 200 is self-contained, meaning the components of the surface mount assembly 200 do not need to be held together during installation or assembled by the installer. In some embodiments, the surface mount assembly 200 may be oriented at any angle, thus eliminating the need for leveling or alignment.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A surface mount assembly for mounting a device in a surface opening of a mounting surface, the surface mount assembly comprising:
   a frame including a plurality of rearward-extending posts each including a locking member cam, the frame being configured to be inserted into the surface opening and attached to the device;
   a plurality of locking mechanisms, each locking mechanism including:
      a locking member including:
         a base configured to retain the locking member in engagement with one of the plurality of posts; and
         a locking arm extending laterally from the base;
      a locker configured to contact the locking member; and
      a biasing element retained by the one of the plurality of posts and configured to bias the locking member from an undeployed position to a deployed position;
   and a cam ring including a plurality of locker cams configured to engage the lockers when the actuation cam ring is rotated from a first position to a second position such that the lockers urge the locking members from an undeployed orientation to a deployed orientation via the locking member cams,
   the biasing elements being configured to urge the locking members from an undeployed position to a deployed position when the locking members are urged from the undeployed orientation to the deployed orientation,
   the cam ring being further configured to engage the lockers when the locking members are in the deployed position and the cam ring is moved from the second position to the first position such that the lockers retain the locking members in the deployed position so as to secure the surface mount assembly and hence the device in the surface opening.

2. The surface mount assembly of claim 1, each locking member including a plurality of locking teeth, each locker including a plurality of locking teeth configured to engage the plurality of locking teeth of one of the locking members when the locking members are in the deployed position and the cam ring is moved from the second position to the first position.

3. The surface mount assembly of claim 1, each of the plurality of posts including a central channel, the base of each locking member being positioned in one of the central channels.

4. The surface mount assembly of claim 1, each locker including a sloped surface configured to contact the locking arm, the sloped surface and the locking member cam of the one of the plurality of posts being cooperatively configured to urge the locking arm to the deployed orientation.

5. The surface mount assembly of claim 1, each locker including a cam follower notch, the locker cams of the cam ring being configured to be positioned in the cam follower notches.

6. The surface mount assembly of claim 1, the frame further including a central opening and an outer flange, wherein the central opening, flange, and cam ring are circular and concentric with each other.

7. The surface mount assembly of claim 1, the frame further including a plurality of locker supports configured to guide the lockers diagonally away from the frame when the cam ring is rotated from the first position to the second position and diagonally toward the frame when the cam ring is rotated from the second position to the first position.

8. The surface mount assembly of claim 7, each locker support including an angled groove, each locker including an angled rail configured to be aligned in one of the angled grooves.

9. The surface mount assembly of claim 1, the plurality of locking mechanisms including three locking mechanisms spaced equidistant from each other.

10. A surface mount assembly for mounting a device in a surface opening of a mounting surface, the surface mount assembly comprising:
   a frame including:
      a plurality of rearward-extending posts each including a locking member cam; and
      a plurality of locker supports near the plurality of rearward-extending posts,
      the frame being configured to be inserted into the surface opening and attached to the device;
   a plurality of locking mechanisms, each locking mechanism including:
      a locking member including:
         a base configured to retain the locking member in engagement with one of the plurality of posts; and
         a locking arm extending laterally from the base;
      a locker configured to contact the locking member; and a biasing element retained by the one of the plurality of posts and configured to bias the locking member from an undeployed position to a deployed position; and an actuation mechanism configured to engage the lockers when the actuation mechanism is moved from a first position to a second position such that the lockers urge the locking members from an undeployed orientation to a deployed orientation via the locking member cams, the biasing elements being configured to urge the locking members from an undeployed position to a deployed position when the locking members are urged from the undeployed orientation to the deployed orientation, the actuation mechanism being further configured to engage the lockers when the locking members are in the deployed position and the actuation mechanism is moved from the second position to the first position such that the lockers retain the locking members in the deployed position so as to secure the surface mount assembly and hence the device in the surface opening, the plurality of locker supports being configured to guide the lockers diagonally away from the frame when the actuation mechanism is moved from the first position to the second position and diagonally toward the frame when the actuation mechanism is moved from the second position to the first position.

11. The surface mount assembly of claim 10, each locker support including an angled groove, each locker including an angled rail configured to be aligned in one of the angled grooves.

12. The surface mount assembly of claim 10, the plurality of locking mechanisms including three locking mechanisms spaced equidistant from each other.

13. The surface mount assembly of claim 10, each locking member including a plurality of locking teeth, each locker including a plurality of locking teeth configured to engage the plurality of locking teeth of one of the locking members when the locking members are in the deployed position and the actuation mechanism is moved from the second position to the first position.

14. The surface mount assembly of claim 10, each of the plurality of posts including a central channel, the base of each locking member being positioned in one of the central channels.

15. The surface mount assembly of claim 10, each locker including a sloped surface configured to contact the locking arm, the sloped surface and the locking member cam of the one of the plurality of posts being cooperatively configured to urge the locking arm to the deployed orientation.

* * * * *